United States Patent
Goel et al.

(10) Patent No.: US 8,561,209 B2
(45) Date of Patent: Oct. 15, 2013

(54) VOLUME ENCRYPTION LIFECYCLE MANAGEMENT

(75) Inventors: Sachin Goel, Bellevue, WA (US); Stein Erik Dolan, Bellevue, WA (US); William B. Lees, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/329,351

(22) Filed: Dec. 19, 2011

(65) Prior Publication Data

US 2013/0160139 A1 Jun. 20, 2013

(51) Int. Cl.
 *G06F 21/00* (2013.01)
(52) U.S. Cl.
 USPC .......................................................... 726/27
(58) Field of Classification Search
 USPC ...................................................... 726/26–30
 See application file for complete search history.

(56) References Cited

U.S. PATENT DOCUMENTS

| | | | |
|---|---|---|---|
| 6,185,308 B1 | 2/2001 | Ando | |
| 6,643,670 B2 | 11/2003 | Parham et al. | |
| 6,654,771 B1 | 11/2003 | Parham et al. | |
| 6,986,043 B2 | 1/2006 | Andrew et al. | |
| 7,584,195 B2 | 9/2009 | Johnson et al. | |
| 7,590,868 B2 | 9/2009 | Musa | |
| 7,831,833 B2 | 11/2010 | Gaylor | |
| 7,921,304 B2 | 4/2011 | Brace et al. | |
| 7,929,706 B2 | 4/2011 | Li | |
| 8,266,433 B1 | 9/2012 | Przykucki | |
| 2002/0120637 A1 | 8/2002 | Parham et al. | |
| 2006/0085845 A1 | 4/2006 | Davis et al. | |
| 2006/0282881 A1 | 12/2006 | Johnson et al. | |
| 2006/0282900 A1 | 12/2006 | Johnson et al. | |
| 2007/0124308 A1 | 5/2007 | Johnson | |
| 2008/0235581 A1* | 9/2008 | Caporale et al. | 715/706 |
| 2008/0270781 A1 | 10/2008 | Ibrahim et al. | |
| 2009/0144557 A1 | 6/2009 | Sutton | |
| 2009/0185688 A1* | 7/2009 | Lotspiech et al. | 380/277 |
| 2009/0210456 A1 | 8/2009 | Subramaniam | |
| 2010/0086134 A1 | 4/2010 | Ureche et al. | |
| 2010/0162361 A1 | 6/2010 | Lees | |
| 2010/0202617 A1 | 8/2010 | Balakrishnan et al. | |
| 2010/0228990 A1 | 9/2010 | Billings | |
| 2010/0266132 A1 | 10/2010 | Bablani et al. | |
| 2011/0061112 A1* | 3/2011 | Berengoltz et al. | 726/30 |
| 2011/0126027 A1 | 5/2011 | Brace et al. | |
| 2013/0013787 A1 | 1/2013 | Johnson | |

OTHER PUBLICATIONS

"RSA Credential Manager", Retrieved at <<http://www.rsa.com/node.aspx?id=1180>>, Retrieved Date: Sep. 29, 2011, pp. 2.

(Continued)

*Primary Examiner* — Brandon Hoffman
*Assistant Examiner* — Anthony Brown

(57) ABSTRACT

Aspects of the subject matter described herein relate to encryption lifecycle management. In aspects, an orchestrating agent is installed on a device upon which encryption management is desired. During the lifecycle of the device, the orchestrating agent facilitates performing actions to protect the data of the device. For example, at certain points during the actions, the orchestrating agent may deduce the presence of external entities needed to perform the actions and interact with those entities to protect the data. During its facilitating activities, the orchestrating agent may also escrow protector data to use to unlock the data for legitimate stakeholders of the data.

17 Claims, 5 Drawing Sheets

(56) References Cited

OTHER PUBLICATIONS

"Enterprise Encryption Key Management", Retrieved at <<http://www.venafi.com/Products/Venafi-Encryption-Director/Encryption-Key-Management/Enterprise-Key-Management.aspx>>, Retrieved Date: Sep. 29, 2011, p. 1.

"TCG TPM Integration Test", Retrieved at <<http://msdn.microsoft.com/en-us/library/ff567627(v=vs.85).aspx>>, Retrieved Date: Sep. 29, 2011, pp. 10.

"Sophos SafeGuard® Disk Encryption 4.60", Retrieved at <<http://tw.sophos.com/sophos/docs/eng/manuals/sde_46_heng.pdf>>, Jun. 2009, pp. 1-168.

"Cisco Storage Media Encryption", Retrieved at <<http://www.cisco.com/en/US/prod/collateral/ps4159/ps6409/ps6028/ps8502/product_data_sheet0900aecd8068ed59.html>>, Retrieved Date: Sep. 29, 2011, pp. 4.

"Blue Cross Blue Shield of Tennessee auto-encrypts patient data", Retrieved at <<http://www-01.ibm.conn/software/success/cssdb.nsf/CS/STRD-8JZDVH?OpenDocument&Site=default&cty=en_us>>, Jul. 22, 2011, pp. 4.

"Infrastructure Independent Recovery Key Release", 13310813, Filed Date: Dec. 5, 2011, pp. 59.

"Single Use Recovery Key", 13316587, Filed Date: Dec. 12, 2011, pp. 60.

"Planning for Single Use Recovery Keys", Retrieved at <<http://onlinehelp.microsoft.com/en-us/mdop/hh301925.aspx>>, Retrieved Date: Oct. 10, 2011, p. 1.

Rose, Stephen L, "Simplify BitLocker Support with MBAM", Retrieved at <<http://windowsteamblog.com/windows/b/springboard/archive/2011/07/01/simplify-bitlocker-support-with-mbam.aspx>>, Jul. 1, 2011, pp. 3.

"BitLocker Drive Encryption Operations Guide: Recovering Encrypted Volumes with AD DS", Retrieved at <<http://technet.microsoft.com/en-us/library/cc771778(WS.10).aspx>>, Retrieved Date: Oct. 10, 2011, pp. 33.

Smith, et al. What's New in Microsoft Desktop Optimization Pack (MDOP): Microsoft BitLocker Administration and Monitoring (MBAM), Retrieved at <<http://media.ch9.ms/teched/na/2011/ppt/WCL317.pptx>>, Microsoft Tech.ed, North America, May 16-19, 2011, pp. 35.

"Deploying MBAM on Distributed Servers", Retrieved at <<http://onlinehelp.microsoft.com/en-us/mdop/hh285628.aspx>>, Retrieved Date: Oct. 5, 2011, pp. 4.

Hynes, Byron, "Advances in BitLocker Drive Encryption", Retrieved at http://technet.microsoft.com/en-us/magazine/2008.06.bitlocker.aspx, Retrieved Date: Oct. 5, 2011, pp. 6.

"Microsoft desktop optimization pack for software assurance, Virtualization and Manageability for a Flexible Workstyle", Retrieved at <<http://download.microsoft.com/download/2/0/5/2059593AFF96-42C8-8560-71AD019503C6/MS_MDOP%20Bro_0611_Printer_f1_lowRes.pdf, Retrieved Date: Oct. 5, 2011, pp. 23.

"Planning and Configuring Group Policy for MBAM", Retrieved at <<http://onlinehelp.microsoft.com/en-us/mdop/hh285629.aspx>>, Retrieved Date: Oct. 5, 2011, pp. 8.

Hargreaves, et al., "Potential Impacts of Windows Vista on Digital Investigations", Proceedings of Advances in Computer Security and Forensics (ACSF) 2007, Liverpool, John Moores University, 8 pages.

U.S. Appl. No. 13/310,813, Non Final Rejection mailed Apr. 16, 2013, 12 pages.

* cited by examiner

VOLUME ENCRYPTION LIFECYCLE MANAGEMENT

BACKGROUND

Some operating systems and other programs have the capability of encrypting data of a volume. This helps ensure that only the person(s) who knows the appropriate security codes is able to access data on the volume—even if the computer hosting the volume is stolen. While the idea of the safety of encrypted data is appealing to companies from a theoretical standpoint, unfortunately, the logistics of securely encrypting the data of a computer that will actually be used by an employee are complex and may take a variable, unknown amount of time. As a consequence, many companies and other organizations are reluctant to embrace volume encryption technology.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to encryption lifecycle management. In aspects, an orchestrating agent is installed on a device upon which encryption management is desired. During the lifecycle of the device, the orchestrating agent facilitates performing actions to protect the data of the device. For example, at certain points during the actions, the orchestrating agent may deduce the presence of external entities needed to perform the actions and interact with those entities to protect the data. During its facilitating activities, the orchestrating agent may also escrow protector data to use to unlock the data for legitimate stakeholders of the data.

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrase "first version" and "second version" does not necessarily mean that the first version is the very first version or was created before the second version or even that the first version is requested or operated on before the second versions. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
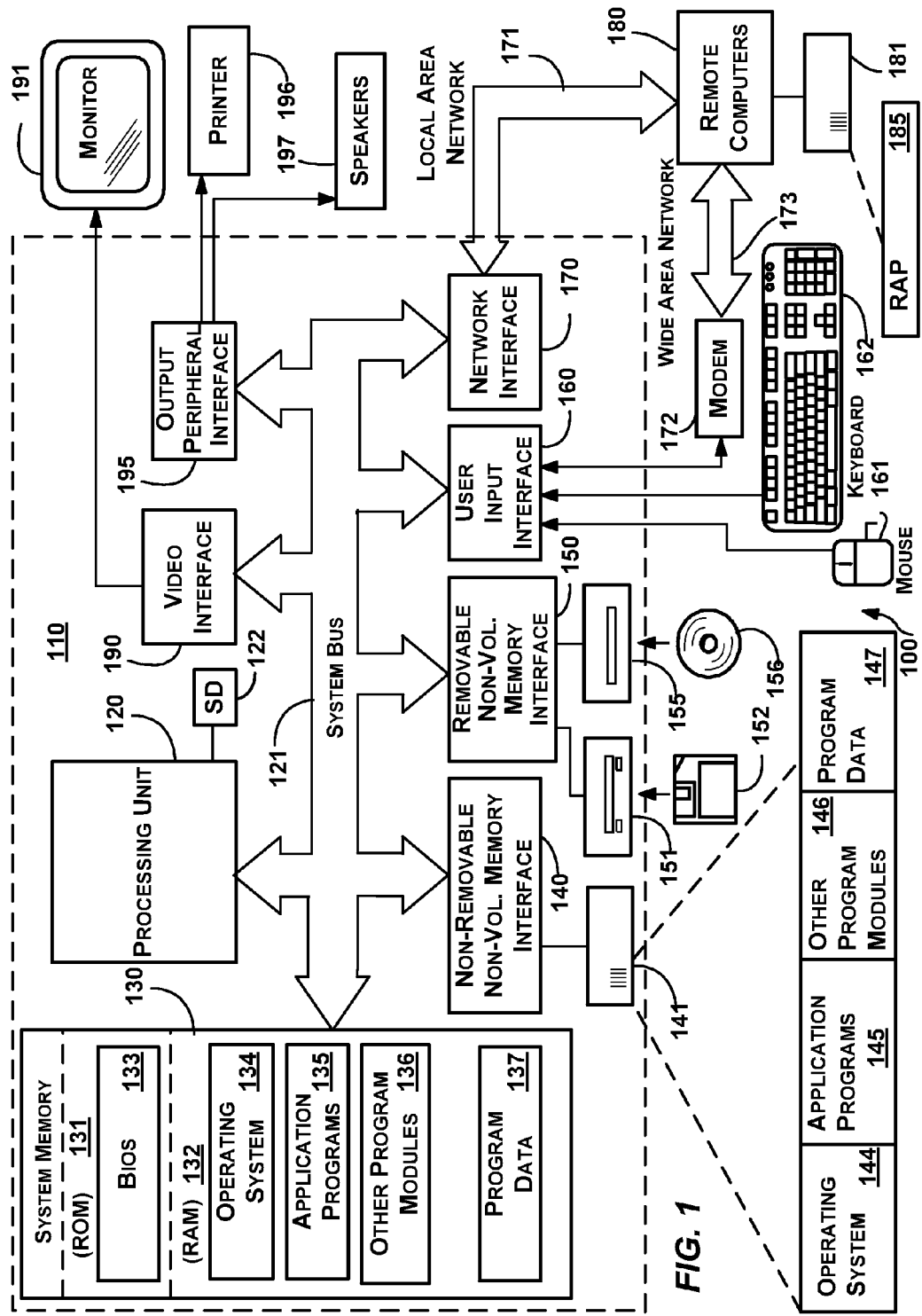
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device 122. The security device 122 may store and be able to generate cryptographic keys (e.g., via a cryptographic key generator) that may be used to secure various aspects of the computer 110. In one embodiment, the security device 122 may comprise a Trusted Platform Module (TPM) chip, TPM Security Device, or the like. A TPM chip may have an embedded secret key embedded therein (e.g., burned into the chip) and may be able to authenticate hardware devices by creating a hash based on data regarding the hardware devices of the computer 110.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable non-volatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Volume Encryption

As mentioned previously, because of various factors regarding encrypting volume data, many companies and other organizations are reluctant to embrace volume encryption technologies.

Figure 2:
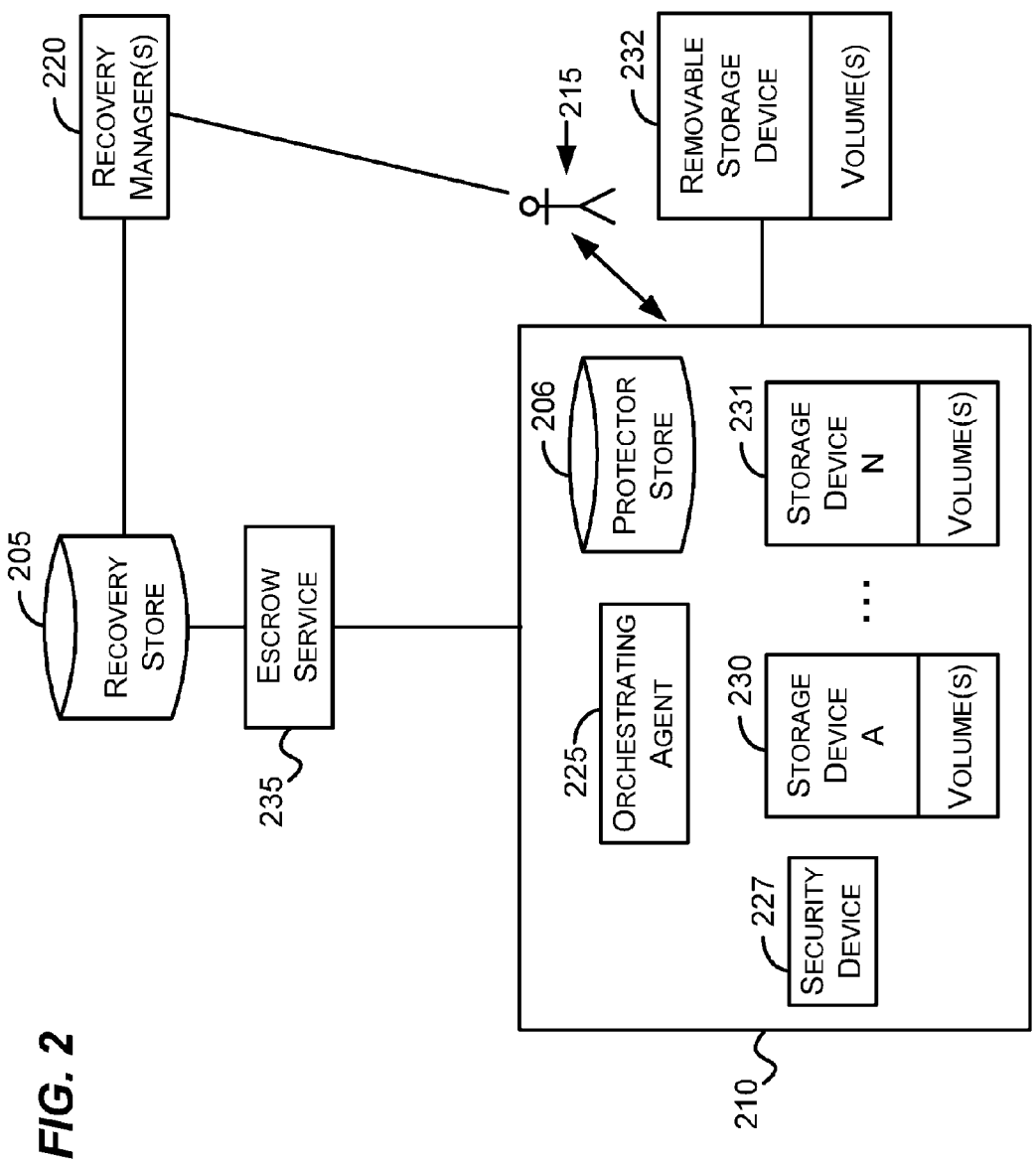
FIG. 2 is a block diagram that represents an exemplary environment in which aspects of the subject matter described herein may be implemented.

FIG. 2 is a block diagram that represents an exemplary environment in which aspects of the subject matter described herein may be implemented. The components illustrated in FIG. 2 are exemplary and are not meant to be all-inclusive of components that may be needed or included. In other embodiments, the components described in conjunction with FIG. 2 may be included in other components (shown or not shown) or placed in subcomponents without departing from the spirit or scope of aspects of the subject matter described herein. In some embodiments, the components and/or functions described in conjunction with FIG. 2 may be distributed across multiple devices.

As used herein, the term component is to be read to include hardware such as all or a portion of a device, a collection of one or more software modules or portions thereof, some combination of one or more software modules or portions thereof and one or more devices or portions thereof, and the like. A component may include or be represented by code.

One or more of the components illustrated in FIG. 2 may be implemented using one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to implement the components of FIG. 2 comprises the computer 110 of FIG. 1.

Turning to FIG. 2, the environment may include a recovery store 205, a device 210 (sometimes referred to as a computing device), a user 215, a recovery manager(s) 220, an escrow service 235, and other components (not shown). At various times in its life, the device 210 may include one or more of: a protector store 206, an orchestrating agent 225, a security device 227, one or more storage devices 230-231, and other components (not shown) and may be attached to a removable storage device 232 and remote storage (not shown). The orchestrating agent 225 facilitates protecting the data on volumes of storage devices of the device 210 during the lifecycle of the device 210 and storage devices. More details on the orchestrating agent 225 will be described below after describing other components of the environment of FIG. 2.

The recovery store 205 and the protector store 206 may be implemented using any storage media capable of storing data. The storage media may include volatile memory (e.g., cache, RAM, and other volatile memory described in conjunction with FIG. 1) and nonvolatile memory (e.g., solid state storage, hard disk storage, and other nonvolatile memory described in conjunction with FIG. 1). The protector store 206 may be external, internal, or include components that are both internal and external to the device 210. In one implementation, the protector store 206 may be stored on one or more of: the storage devices 230-232 and remote storage. The protector store 206 may store an arbitrary but finite number of keys for each protected volume.

In one embodiment, each protected volume has its own protector store and this protector store is stored upon a storage device that includes the volume. In this embodiment, the protector store for a volume may be accessible for consultation and lookup operations only when the volume is unlocked. In this embodiment, the protector store may not visible or useable when a volume is locked, except to unlock the volume. Once a volume is unlocked, the protector store of the volume may be enumerated and additional keys may be added to the protector store of the volume.

The recovery store 205 may be used to store data that may be used to unlock volume(s) of devices. Data that may be used to unlock a volume allows the volume to be decrypted either directly or through a chain of keys as described in more detail below.

The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like The recovery store 205 may be implemented as a database. The database may comprise a relational database, object-oriented database, hierarchical database, network database, other type of database, some combination or extension of the above, and the like. Data stored in a database may be organized in tables, records, objects, other data structures, and the like. The data stored in a database may be stored in dedicated database files, dedicated hard drive partitions, HTML files, XML files, spreadsheets, flat files, document files, configuration files, other files, and the like. A database may reference a set of data that is read-only to the database or may have the ability to read and write to the set of data.

Data in a database may be accessed via a database management system (DBMS). A DBMS may comprise one or more programs that control organization, storage, management, and retrieval of data of a database. A DBMS may receive requests to access data in a database and may perform the operations needed to provide this access. Access as used herein may include reading data, writing data, deleting data, updating data, a combination including two or more of the above, and the like. In one embodiment, the escrow service 235 may include or interact with a DBMS to access the data of the recovery store 205.

In describing aspects of the subject matter described herein, for simplicity, terminology associated with relational databases is sometimes used herein. Although relational database terminology is sometimes used herein, the teachings herein may also be applied to other types of databases including those that have been mentioned previously.

Although as illustrated in FIG. 2, only one device (i.e., the device 210) is shown, there may be an arbitrary number of devices associated with an organization. The recovery store 205 may store recovery key data for each volume of each device of an organization. Recovery key data may be used to unlock an encrypted volume as described in more detail below.

The device 210 may be connected to one or more internal storage devices (e.g., the storage devices 230-231), to one or more removable storage devices (e.g., the removable storage device 232), and to one or more remote storage devices (not shown). The storage devices 230-231 may be housed inside the chassis of the device 210 and are sometimes referred to herein as fixed drives while the volumes stored on the fixed drives are sometimes referred to as fixed volumes. The removable storage device 232 may be connected to the device 210 through an interface whereby the removable storage device 232 is readily attached and unattached from the device 210. Remote storage devices may be connected to the device 210 via a network. The storage devices 230-232 and the remote storage devices, if any, may be implemented using, for example, types of computer storage media described in conjunction with FIG. 1.

A storage device may be formatted with one or more volumes. A volume is a storage area on a storage device that is accessible by a file system. A volume is often included on a single partition of the storage device, but may span partitions, be contained in a file, or be otherwise represented without departing from the spirit or scope of aspects of the subject matter described herein. A volume that includes an operating system is sometimes referred to herein as an operating system volume while a volume that does not include an operating system is sometimes referred to herein as a non-operating system volume.

Each volume of a storage device may be encrypted using an encryption key. The encryption key may be secured (e.g., encrypted) by another encryption key which may be secured by another encryption key and so forth. For example, an operating system volume may store encryption keys for non-operating system volumes hosted on the same device.

Multiple entities may have "property rights" in the data of an encrypted volume. The term "property rights" refers to a valid interest in obtaining the encrypted data of the volume in an unencrypted form. While in almost all cases a user who frequently uses the device 210 would have property rights in the data of a volume, other entities may also have property rights as well. For example, a company or other entity that owns the device 210, other users who also use the device 210, users who have the rights to logon to the device 210 (even if they have never logged on in the past), people who have created or updated documents that are stored on the device 210, and others may have property rights in the data of an encrypted volume. The term "stakeholder" is sometimes used to refer to an entity that has property rights to data stored on the volume.

In a regular logon, the device 210 may not decrypt data on a volume unless a user (e.g., the user 215) supplies the device 210 with valid credentials. Using the valid credentials and potentially other data (e.g., data in the protector store 206), the device 210 may generate or otherwise obtain an encryption key that allows the device 210 to decrypt encrypted data that is stored on a volume.

There may occur times, however, when logon credentials may not be used to access protected data on a secured volume. For example, the device may enter into a recovery mode (as described below), there may be no users who can or will supply logon credentials to the device 210, the volume may be moved from one machine to another, or some other event may occur. At these times, a recovery protocol may be engaged in to obtain a key to unlock a volume of the device.

For example, the device 210 may enter recovery mode and deny access to the volumes 230-232 for any of a number of reasons. For example, if the BIOS, operating system, or other programs of the device 210 have been changed, if a user makes too many failed attempts to logon, if other configuration settings change, or if some other event occurs, the device 210 may deny access to the volumes 230-232 until recovery data is provided to the device 210.

If the device 210 enters a recovery mode, the device 210 may display a string (e.g., a recovery key identifier) that the user 215 is to provide to the recovery manager(s) 220. In response to providing the string and potentially stakeholder data, the recovery manager(s) 220 may provide recovery key data that may be used to unlock a volume of the device 210.

If there are no users who can or will supply logon credentials to the device 210, a stakeholder may cause the device 210 to enter the recovery mode so that the stakeholder can unlock volume(s) on the device 210 using the mechanism above.

If a protected volume is removed or disconnected from the device 210 and connected to another computer, the other computer may not have a key with which to unlock the volume. To unlock the volume, a volume identifier may be supplied to the recovery manager(s) 220 which may use the volume identifier and potentially other data to obtain a key by which the volume may be unlocked.

In one embodiment, the recover manager(s) 220 may be implemented by a help desk person or the like who interfaces with a portal (e.g., a Web interface) or other user interface that interacts with the recovery store 205. The portal may display input elements (e.g., text boxes) for receiving various data (e.g., a volume identifier, a recovery key identifier, stakeholder data, and/or other data), receive input from the help desk person, and display recovery key data if the inputted items match corresponding data in the recovery store 205.

The recovery manager 220 and the user 215 may communicate via telephone, network, e-mail, telegram, regular mail, or any other form of communication. The form of communication between the user 215 and a recovery manager may be chosen (e.g., by a business or other entity obtaining or providing the recovery).

In another embodiment, the recovery manager(s) 220 may be implemented as a component that receives data directly (e.g., via a Web service, user interface, or otherwise) from the user 215 and provides the recovery key data upon receiving the appropriate information (e.g., recovery key identifier, volume identifier, and/or potentially stakeholder data) from the user 215.

In one embodiment, the recovery manager(s) 220 may authenticate the user 215. This may be done, for example, by asking one or more challenge questions to which the user responds, receiving a PIN, password, or other user-known data from the user, obtaining, with consent, biometric data (e.g., fingerprint, retina, DNA, or other biometric data), receiving a code from a portable item (e.g., a USB key, smart card, or the like), obtaining other credentials, a combination of two or more of the above, and the like. This information may authenticate that the user 215 is the stakeholder the user 215 represents the user 215 is.

It is not required that the recovery manager(s) 220 follow a key release procedure that is totally secure from social engineering or other attacks. For example, one key release procedure may include verifying that the communication comes from a company-trusted telephone number or other company-trusted communication endpoint and obtaining varying amounts of data in conjunction with obtaining a key recovery value from the recovery store 205. The varying amounts of information may be as little as a recovery key identifier or even another identifier (e.g., volume identifier, serial number, asset number, owner or user name, or the like) that identifies a protected volume.

Furthermore, although allowed, it is not required that the user 215 have administrator rights to the device 210. Indeed, the user 215 may have standard user rights, power user rights, administrator rights, or some other rights without departing from the spirit or scope of aspects of the subject matter described herein.

In the recovery store 205, recovery key data may be part of a tuple that associates the recovery key data with other data. For example, the recovery store 205 may associate recovery key data with a machine identifier, a volume identifier, stakeholder data, a recovery key identifier, a name of a computer/device that sent the above data, or other data described below. One or more portions of the data associated with the recovery key data may be used to find and obtain the recovery key data from the recovery store 205. The recovery key data may then be used to unlock the associated volume. Protector data refers to the recovery key data and potentially some or all of its associated data.

A machine identifier may identify a device that is connected to storage devices (e.g., the device 210). For example, the machine identifier may be encoded in hardware or stored in nonvolatile memory of the device 210. This machine identifier may serve to distinguish the device 210 from other devices, if any.

The volume identifier may identify a volume of the device. The volume identifier may be a string, number, or other data that identifies a volume. In one embodiment, the volume identifier is sufficient to identify the volume even if the storage device that houses the volume is removed or disconnected from the device 210.

Stakeholder data identifies entities who are stakeholders of a volume. Stakeholder data may include any type of data that may be used to identify entities who are stakeholders of a volume. For example, stakeholder data may include logon facts such as domain names and user names of users. As another example, stakeholder data may include data that is derived from the logon facts through the use of a function. As another example, stakeholder data may include strings that have been assigned to identify users who are stakeholders.

The above examples of stakeholder data are not intended to be all-inclusive or exhaustive of the types of data that may be used to identify entities that are stakeholders of a volume. Based on the teachings herein, those skilled in the art may recognize many other types of data that may be used to identify stakeholders without departing from the spirit or scope of aspects of the subject matter described herein.

A recovery key identifier may include a string. This string may be displayed (e.g., on a display of the device 210) and responded to in a sequence of steps used to recover the recovery key data mentioned above. A recovery key identifier may be associated with a protected volume of the device 210. There may be a recovery key identifier associated with each protected volume of the device 210. Recovery key identifiers of different volumes may be different. In one embodiment, recovery key identifiers may also be different for a given prefix substring (e.g., the first eight characters). A recovery key identifier may be printable or transmittable in plain text.

Recovery key data may be used to unlock a volume. Unlocking a volume means that the recovery key data may be used directly or indirectly to decrypt the volume. For example, in one implementation, the recovery key data may be the actual encryption key that can be used to decrypt the volume. The length of the recovery key data may be configurable and may vary from implementation to implementation. In one implementation, the length may be 48 digits. The recovery key data may be printable or transmittable in plain text. Sometimes herein, the term key is used. Unless the context indicates otherwise, the term key is to be read as recovery key data.

If the recovery key data is not the actual encryption key that was used to encrypt the volume, it may be used indirectly to decrypt the volume by being used in a chain of two or more keys to obtain the encryption key. For example, the recovery key data may be used as a key to obtain the encryption key, the recovery key may be used to obtain a key that can then be used to obtain the encryption key, or the recovery key may be used in a longer chain of obtaining keys to obtain the encryption key.

The security device 227 is similar to the security device 122 of FIG. 1 and may be implemented in the manner described in conjunction with FIG. 1. Among other things, the security device 227 may store "root" data that may be used to protect data stored on one or more of the storage devices 230-232 and also to ensure that other components of the device 210 have not been tampered with. The term "root trust device" is to be read as a synonym for a device that operates as the security device 227.

As mentioned previously, the orchestrating agent 225 facilitates protecting the data on volumes of the device 210 during the lifecycle of the device 210. By causing protector data to be stored, the orchestrating agent 225 is also involved in ensuring the protected data is accessible to legitimate stakeholders. As an exemplary lifecycle, the device 210 may be purchased from a retailer or other entity, configured for the use of a member of an organization, passed from one member of the organization to another member of the organization, have storage devices connected to and disconnected from it, sit in storage for a period of time, and eventually be sold or otherwise disposed of. At each stage of the device 210's lifecycle, the orchestrating agent 225 may take actions to ensure that the data of the device 210 is protected from unauthorized user and yet accessible to legitimate stakeholders.

For example, when the device 210 is received from a distributor, retailer, vendor, manufacturer, or the like, the device may or may not have an operating system or other software installed. In addition, at this time, the orchestrating agent 225 and the protector store 206 may not be on the device 210. The device 210 may have zero or more storage devices housed within the chassis of the device 210 and zero or more removable storage devices.

When received, the device 210 will most often include the security device 227, but this is not a requirement as the security device 227 may be added after the device 210 is received.

After receiving the device, an organization may desire to configure the device such that the data stored on volumes connected to the device is protected. To ensure that the volume data is protected (perhaps in a provably secure way), the organization may desire to follow a series of steps. One of these steps includes installing the orchestrating agent 225 on the device 210. This step may be performed automatically (e.g., by a duly authorized external management authority program) that injects (e.g., sends) code that implements the orchestrating agent 225 onto the device 210), manually (e.g., by a system administrator, end user or the like who installs the orchestrating agent 225 onto the device 210), or through a combination of manual and automatic steps.

After the orchestrating agent 225 is installed, the orchestrating agent 225 may facilitate that other steps are taken in a certain order and in response to certain events to ensure that the data of volumes connected to the device is protected and accessible throughout the lifetime of the volumes.

The term "facilitate" is used as the orchestrating agent 225 may have control over performing some of the steps but not have ultimate control over performing others of the steps. For example, the orchestrating agent 225 may cause a volume to be encrypted but may only request and remind, perhaps repeatedly, a user to take ownership of a security device. In one sense, the term "facilitate" implies that for some actions, the orchestrating agent 225 may cause the actions to be performed in an appropriate order without assistance from a human entity. For other actions, however, the orchestrating agent assists but may ultimately rely on an external entity to perform these other actions.

The orchestrating agent 225 may request that an external entity perform an action at a specified point in the protecting process so that protecting actions may take place in a pre-defined ordering. A pre-defined ordering means that the ordering is represented (e.g., in a database, code, policy, or otherwise) and that the ordering is not random. A pre-defined ordering does not mean that the ordering may not change. A pre-defined ordering does not require that other actions not specified in the order are not allowed to occur. In other words, other actions may potentially be interspersed with the pre-defined order of actions.

The orchestrating agent 225 may detect when an external entity (e.g., a technician, end user, or the like) is interacting with the device 210. In one embodiment, the term detect is to be read to mean to discover by performing actions. In another embodiment, the term detect is to be read to include the above discovery or alternatively being informed (e.g., by another component) that the state currently exists. If the context does not indicate otherwise, the term detect is to be read as indicated in the other embodiment above.

In response to detecting that an external entity is interacting with the device 210, the orchestrating agent 225 may attempt to interact with the external entity. The orchestrating agent 225 may continue to remind and wait for the external entity to perform certain actions before the orchestrating agent 225 will perform other actions that are to happen after the external entity performs the requested actions. By refraining from performing the other actions until the previously requested actions are performed by the external entity, the orchestrating agent 225 may facilitate that the pre-defined ordering is followed.

In one implementation, after being installed on the device 210, the orchestrating agent 225 may facilitate the actions described in more detail below.

The orchestrating agent 225 may cause the security device 227 to be initialized. Initializing the security device 227 may cause the device to prompt a user for confirmation of the initialization. The security device 227 may ensure that the input it receives comes from a physical input device (e.g., keyboard or other input device) attached to the device 210. Upon receiving user confirmation, the device 210 may reboot and the initialization of the security device 227 may complete. Initialization of the security device 227 may involve clearing memory of the security device and configuring the security device 227 to accept a passphrase.

The criteria for a passphrase may differ from implementation to implementation. In one implementation, a passphrase may include any character that can be entered via a keyboard or other input device. In another implementation, a passphrase may include alphanumeric characters, just alphabetic characters, just numeric characters, or some other set of characters.

Similarly, the criteria for a PIN may also differ from implementation to implementation. For example, A PIN may include numbers, numbers and letters, numbers, letters and other characters, or the like.

Furthermore, the complexity of a passphrase or PIN may be configurable (e.g., by an external management authority) and enforced by the orchestrating agent 225 or some other component of the device 210. For example, for a passphrase, complexity may include: the length of the passphrase, the variety of characters of the passphrase, the non-use of certain recognizable words in the passphrase, and the like. Similarly, the complexity of a PIN may also be configurable (e.g., by an external management authority) and enforced by the orchestrating agent 225 or some other component of the device 210.

Once the security device 227 is initialized, the orchestrating agent 225 may ensure that ownership of the security device 227 is taken. In one implementation, once the security device 227 is initialized, the security device 227 may require a passphrase (e.g., to take ownership) before allowing the device 210 to proceed with booting. In this case, the orchestrating agent 225 may facilitate that ownership of the security device 227 is taken by causing the security device 227 to be initialized.

If the security device 227 does not require taking ownership after initialization, the orchestrating agent 225 may facilitate taking ownership of the security device 227 as the next step (e.g., after rebooting) after initializing the security device 227. To do this, the security device 227 may obtain the passphrase and provide it to the security device 227 or call an interface of the security device 227 to cause the security device 227 to obtain the passphrase itself. In taking ownership, a passphrase, PIN, or other data may be provided. This provided data may be used as the root of trust on the device 210. For example, data derived from the provided data may be used to encrypt one or more volumes attached to the device 210.

In conjunction with taking ownership, the security device 227 may generate ownership data. This ownership data may be presented to the security device 227 as evidence of ownership of the security device 227. The security device 227 may allow an entity that presents the ownership data to change the passphrase of the security device 227, initialize the security device 227, perform reset operations, and the like.

The orchestrating agent 225 may obtain the ownership data from the security device 227 and store the ownership data in the protector store 206. The orchestrating agent may also provide the ownership data together with any other protector data to the escrow service 235. The escrow service 235 may then store the ownership data in the recovery store 205 and any other protector data provided by the orchestrating agent 225. The escrow service 235 may also associate the ownership data with the protector data to allow finding the ownership data from all or some of the protector data as appropriate.

In some organizations, it may be desirable to provide the end user with a machine that is configured with an encrypted operating system volume. The operating system volume may further be configured with proprietary and other applications used within the organization. Rather than having the end user install and configure the operating system and these other programs, an organization may have a technician or the like install the operating system and other programs and configure the device 210.

In the scenario above, it may be desirable to allow or not allow the end user to provide a PIN that may be used with other data (e.g., data from the security device 227) to protect the operating system volume.

In the case of not allowing the end user to provide a PIN to protect the operating system, the orchestrating agent 225 may create protector data using a key or other data from the security device 227. The orchestrating agent may store the protector data in the protector store 206 and provide the protector data to the escrow service 235. As mentioned previously protector data may include a key used to protect a volume and any associated data. In this case, the protector data may include data stored or generated by the security device 227.

Encrypting the operating system volume may involve a variable amount of time. This is due, in part, to the amount of data that may need to be encrypted as well as the speed at which the data can be encrypted by the hardware of the device 210. Prior to allowing the encryption of the operating system volume to proceed, the orchestrating agent 225 may cause the protector data to be stored in the protector store 206 and in the recovery store 205. The orchestrating agent 225 may wait until confirmation is received that the protector data has been stored in these two places before allowing the encryption of the operating system volume to proceed.

In the case of allowing the end user to provide a PIN, in one implementation, the orchestrating agent 225 may follow the actions above and then, after the computer is delivered to the end user, prompt the user for a PIN and may use the PIN and perhaps data from the security device 227 as protector data to protect a key that may be used to decrypt the operating system volume. In other words, in this case, the orchestrating agent 225 may allow the drive to be encrypted (after storing protector data as mentioned previously), detect that a user has logged onto the device 210, and then prompt the user for a PIN. The orchestrating agent 225 may then store the PIN and other protecting data in the protector store 206 and the recovery store 205. The orchestrating agent 225 may then use the PIN and other protecting data to protect the key previously used to encrypt the operating system volume.

The type of protector data that may be used to protect a volume may be dictated by an external management authority (not shown). This external management authority may send configuration data to the orchestrating agent 225 to indicate what type of protector data is to be used with each class of storage. A class of storage may include, for example, operating system volume, fixed volumes, removable volumes, and the like.

In some implementations, a class of storage may cover volumes on two or more types of storage. For example, some volumes on removable storage devices may be classed with fixed volumes on fixed storage devices. For example, a removable storage device that has spinning media may be classed with fixed storage devices that are housed inside the chassis of a computing device. As another example, a removable storage device that has storage greater than some configurable threshold may be classed with fixed storage devices. As another example, volumes may be classed based on the type of connection (e.g., USB, eSATA, SATA, and so forth).

As one example, configuration data may indicate that a key from the security device 227 is to be used to protect the operating system volume, that a passphrase is to be used to protect volumes on storage devices housed within the chassis of the device 210, and that a passphrase is to be used to protect volumes on removable storage devices. The external management authority may indicate types of protector data that may include a key from the security device 227 as well as any of the data described previously in conjunction with authenticating a user.

Furthermore, the external management authority may change the type of protector data that may be used to protect various types of volumes. To make a change, the external management authority may send configuration data that specifies what type of protector data is to be used with each class of storage. After receiving the configuration data, the orchestrating agent 225 may, upon a next active session, obtain and store new protector data complying with the configuration data, if needed.

Auto-unlock protector data may be obtained for fixed volumes of the device 210. Auto-unlock protector data allows unlocking the fixed volume as long as the fixed volume is housed within a chassis of the device 210 and the operating system volume is unlocked. Auto-unlock protector data may be stored on the operating system volume of the device 210.

In one embodiment, after storing the new protector data, the orchestrating agent 225 may cause the previous protector of the key may be deleted so that it can no longer be used to unlock the volume. In another embodiment, the orchestrating agent 225 may not cause the previous protector to be deleted so that the previous protector data may still be used to unlock the volume.

In another implementation, the orchestrating agent 225 may prompt the user (or the user's delegate) to supply the PIN prior to encrypting the operating system volume. Then, prior to allowing the encryption of the operating system volume to proceed, the orchestrating agent 225 may cause the protector data (e.g., the PIN and possibly data from the security device 227) to be stored in the protector store 206 and in the recovery store 205. The orchestrating agent 225 may wait until confirmation is received that the protector data has been stored in these two places before allowing the encryption of the operating system volume to proceed.

After the operating system volume has been protected, upon detecting an active session (as described in more detail below), the orchestrating agent 225 may request one or more passphrases or other protector data to use in protecting volumes on fixed drives that are housed in the chassis of the device 210. After causing the passphrase(s) or other protector data to be stored in the recovery store 205 and the protector store 206, the orchestrating agent may allow the volumes on the one or more fixed drives to be encrypted.

After volumes on the fixed drives have been protected, the orchestrating agent 225 may protect volumes on removable drives and/or remote drives, if any. In doing this, the orchestrating agent 225 may request one or more passphrases or other protector data to use in protecting volumes on these drives. After causing the passphrase(s) or other protector data to be stored in the recovery store 205 and the protector store 206, the orchestrating agent may allow the volumes on the one or more removable and/or remote drives to be encrypted.

Over the lifecycle of the device 210, drives may be connected and disconnected from the device 210. The drives connected and disconnected may include fixed drives, removable drives, and remote drives. These drives may include volumes that need to be protected or that are already protected.

When a new fixed drive is added with one or more volumes thereon, the orchestrating agent 225 may detect the addition, wait for an active session (described in more detail below), obtain one or more passphrases or other protector data with which to protect the volumes, and cause protector data for the volumes to be stored on the protector store 206 and the recovery store 205. The orchestrating agent 225 may ensure that the protector data is stored prior to allowing data to be encrypted on the volumes.

When a removable drive is connected to the device 210, the orchestrating agent 225 may detect the removable drive's presence. If the drive has a protected volume, the orchestrating agent 225 may obtain a key for the volume and ensure that the key is stored in the protector store 206 and the recovery store 205. If the drive has a volume but the volume is not protected, the orchestrating agent 225 may, if desired by the user or if dictated by the configuration data, protect the volume as previously described.

In one embodiment, for an unprotected volume on a removable drive, the orchestrating agent 225 may make a "best effort" attempt to send the protector data to the escrow service 235 prior to protecting the volume on the removable drive. Best effort may involve attempting up to a configurable number of times to send the protector data to the escrow service 235 and ultimately succeeding or failing. If the best effort fails, in one implementation, the orchestrating agent 225 may still, notwithstanding the failure, protect the volume on the removable drive. In another implementation, if the best effort fails, the orchestrating agent 225 may not protect the volume on the removable drive. The course taken by the orchestrating agent 225 may be dictated by configuration data provided by an external management authority.

When a removable drive is disconnected from the device 210, in an active session, the orchestrating agent 225 may prompt a user as to whether or not to remove the protector data from the protector store 206. If the user indicates that the protector data is to be removed, the orchestrating agent 225 may cause the protector data to be removed from the protector store 206.

The orchestrating agent 225 may perform similar actions when a remote drive is connected to is disconnected from the device 210

A user may change a PIN or passphrase. This may occur, for example, when a user decides that the PIN or passphrase needs to be changed, in response to a policy that dictates that the PIN or passphrase be changed, when the device 210 is passed from one use to another, or the like. In this case, the orchestrating agent 225 may detect this activity and may cause the updated protector data to be stored in the protector store 206 and the recovery store 205.

Figure 3:
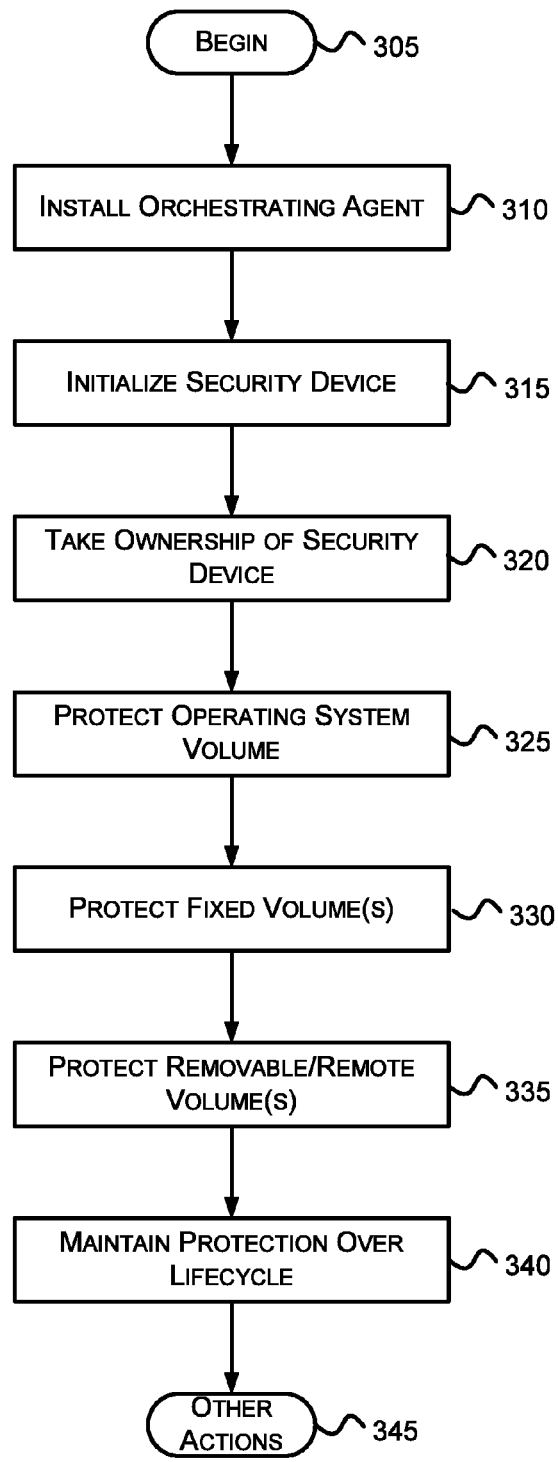
FIG. 3 is a flow diagram that generally represents exemplary actions that may occur to protect data over a lifecycle of a device in accordance with aspects of the subject matter described herein.
Figure 4:
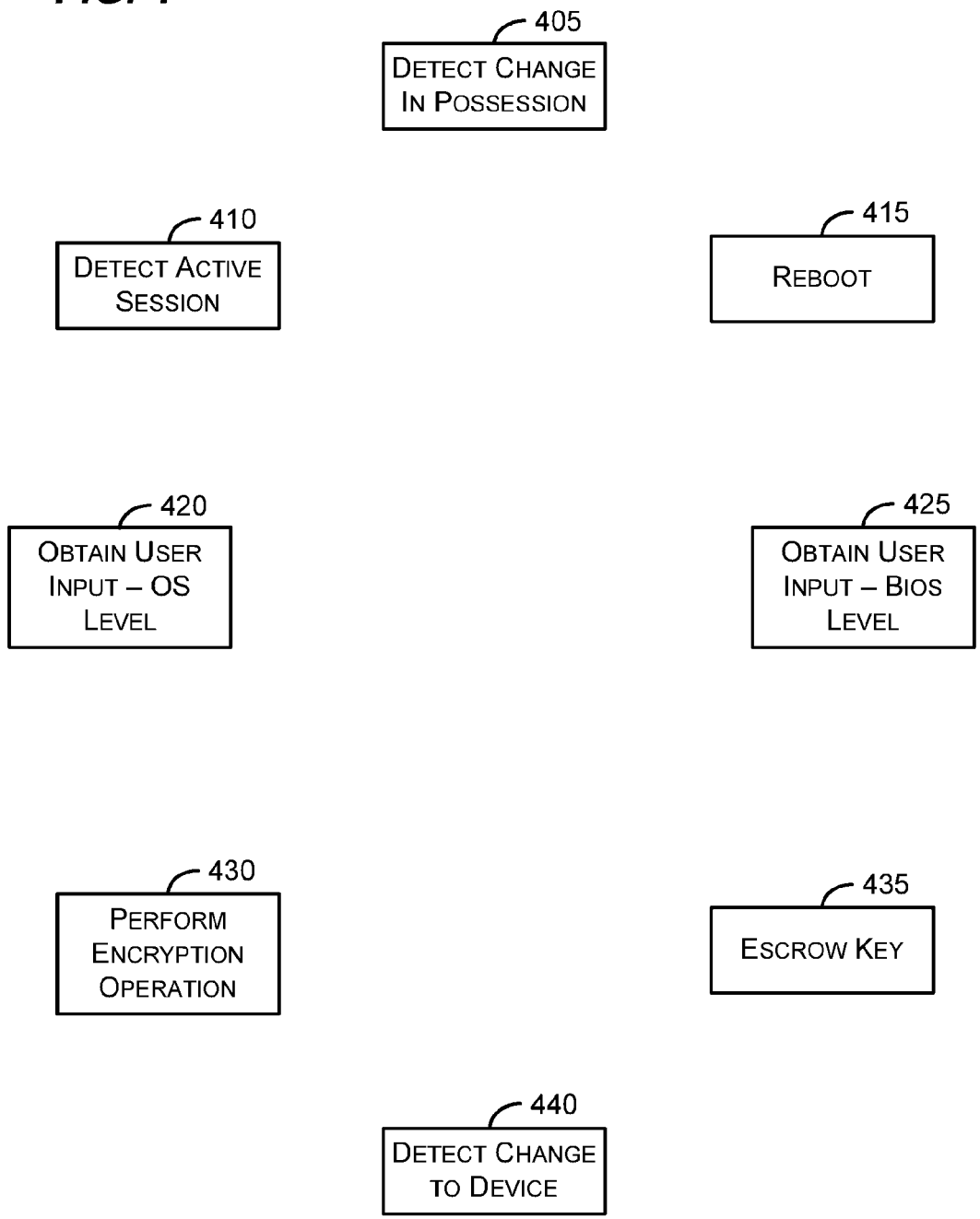
FIG. 4 is a diagram that illustrates some other exemplary actions that may occur before, in conjunction with, or after, the actions described in conjunction with FIG. 3 in accordance with aspects of the subject matter described herein.
Figure 5:
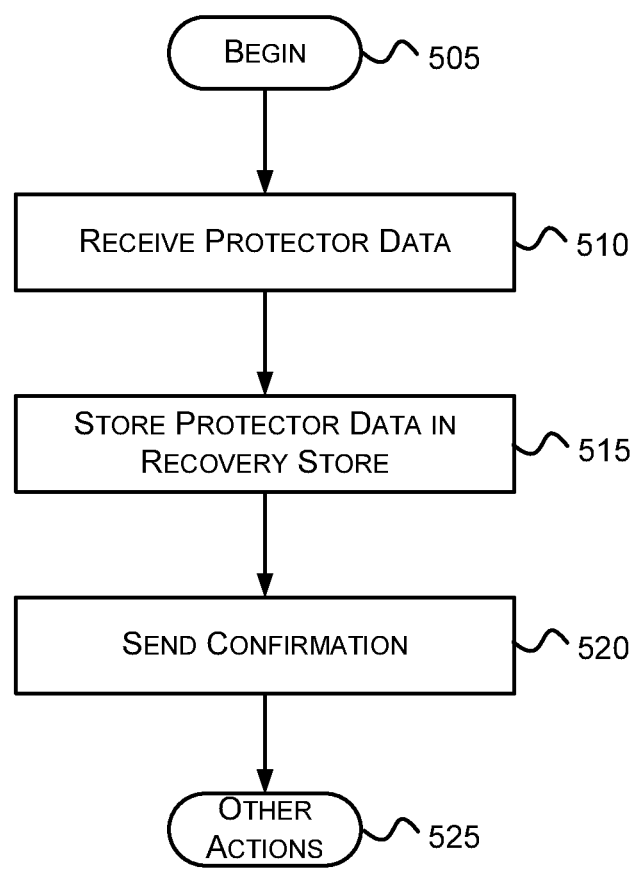
FIG. 5 is a flow diagram that generally represents exemplary actions that may occur at an escrow service in accordance with aspects of the subject matter described herein.

FIGS. 3 and 5 are flow diagrams that generally represent exemplary actions that may occur in accordance with aspects of the subject matter described herein. For simplicity of explanation, the methodology described in conjunction with FIGS. 3 and 5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events FIG. 3 is a flow diagram that generally represents exemplary actions that may occur to protect data over a lifecycle of a device in accordance with aspects of the subject matter described herein. FIG. 4 is a diagram that illustrates some other exemplary actions that may occur before, in conjunction with, or after, the actions described in conjunction with FIG. 3 in accordance with aspects of the subject matter described herein.

Turning to FIG. 3, at block 305, the actions begin. At block 310, an orchestrating agent is installed on a computing device. For example, referring to FIG. 2, the orchestrating agent 225 may be installed on the device 210. Installing an orchestrating agent may include installing code on the computing device automatically, semi-automatically, or manually as described previously. For example, a program such as a configuration manager may send code implementing an orchestrating agent to a computing device and instruct the computing device to store the code on a storage device of the computing device.

At block 315, a root trust device may be initialized. For example, referring to FIG. 2, the orchestrating agent 225 may instruct the security device 227 to prepare for initialization. Referring to FIGS. 2 and 4, this may involve a reboot (e.g., block 415) of the device 210 and obtaining user input at the bios level (e.g., block 425) to confirm a user's physical presence at the device 210.

At block 320, ownership of the root trust device may be taken. For example, referring to FIGS. 2 and 4, the user 215 may enter a PIN, passphrase, or provide other data to take ownership of the security device 227. In conjunction with a user taking ownership of the security device 227, the orchestrating agent 225 may obtain ownership data from the security device 227. The orchestrating agent 225 may send (e.g., block 435) this ownership data to the escrow service 235 for storing the ownership data (and associated data) on the recovery store 205. As described previously, presenting this ownership data to the security device 227 may allow an entity that presents the ownership data to change the passphrase of the security device 227, initialize the security device 227, perform reset operations, and the like.

At block 325, an operating system volume of the device is protected. For example referring to FIGS. 2 and 4, the operating system volume may be protected through encrypting (e.g., block 430) the operating system volume.

In conjunction with protecting the operating system volume, other actions may also occur. For example, the orchestrating agent 225 may obtain protector data for the operating system volume, store this protector data in the protector store 206, provide the protector data to the escrow service 235 for storing on the recovery store 205 (e.g., block 435), receive confirmation that the protector data was stored on the recovery store 205, and after receiving confirmation, allow the system volume to be encrypted.

If the operating system volume is to be protected by the root trust device only, the orchestrating agent 225 may obtain a key or other data from the root trust device (e.g., the security device 227) and provide this key as part of the protector data provided to the escrow service 235. If the operating system volume is to be protected by the root trust device and user supplied data (e.g., a PIN), the orchestrating agent 225 may determine that an active session is present (e.g., block 410) on the device 210, obtain the PIN via an input interface (e.g., keyboard, microphone, mouse, touch screen, or other input device) (e.g., block 420), combine a key from the root trust device with the user supplied data to generate the protector data, and provide this protector data to the escrow service 235 for storing on the recovery store 205 (e.g., block 435). Whether the operating system volume is to be protected by a key supplied by the root trust device only, by a key supplied by the root trust device and user supplied data, or by other protector data may be indicated by an external management authority and facilitated by the orchestrating agent 225.

At block 330, one or more volumes of fixed storage devices of the device are protected. For example, referring to FIGS. 2 and 4, any fixed volumes on the storage devices 230-231 may be protected.

In conjunction with protecting a fixed drive, other actions may also occur. For example, similar to the other actions that may occur when protecting an operating system volume, the orchestrating agent 225 may obtain protector data for the operating system volume, store this protector data in the protector store 206, provide the protector data to the escrow service 235 for storing on the recovery store 205 (e.g., block 435), receive confirmation that the protector data was stored on the recovery store 205, and after receiving confirmation, allowing the system volume to be encrypted (e.g., block 430). In addition to these actions, the orchestrating agent 225 may determine that an active session (e.g., block 410) is present on the device 210 and obtain a PIN, passphrase, or other data from an input interface (e.g., block 420) to incorporate (or data derived therefrom) into the protector data for one or more of the volumes. Incorporating or combining user input into the protector data may include having a hash or other function operate on the user input.

At block 340, one or more volumes of removable and/or remote storage devices, if any, connected to the device are protected. This may be done in the same manner as protection is done for the fixed volumes.

Two or more of the actions above may be performed in an atomic manner. For example, obtaining protector data and storing the protector data may be performed together such that they are not divisible to an external observer.

At block 345, other actions are taken over the lifecycle of the device to maintain protection of the data stored on volumes connected to the device. For example, referring to FIGS. 2 and 4, an additional fixed drive having an additional volume(s) may be added to the device 210. In response, the orchestrating agent 225 may detect this change to the device (e.g. block 440), detect that the additional volume(s) is not protected, wait for an active session (e.g., the next active session) to occur (e.g., block 410), obtain protector data for volume(s) of the device from a input interface (e.g., block 420) of the device 210, provide the protector data to the escrow service 235 (e.g., block 435), and cause the volume(s) of the device to be encrypted (e.g., block 430).

As another example, a removable or remote device may be connected to the device 210. In response, the orchestrating agent 225 may perform actions similar to those described above in conjunction for adding a fixed drive to the device 210.

As another example, a user may change a PIN of a security device or a passphrase of a volume. In response, the orchestrating agent 225 may obtain the new PIN or passphrase, store the new PIN or passphrase in the protector store 206, send the new PIN or passphrase to the escrow service 235, and update keys that protect the component based on the PIN or passphrase as appropriate.

If a user seeks to take ownership of the security device 227, the orchestrating agent 225 may guide the user through the process of taking ownership and may then update protector data as appropriate.

Turning to FIG. 4, at block 405, a change in possession of the device may be detected. For example, referring to FIG. 2, over its lifecycle, the device 210 may be passed from user to user. Detecting this change may take many forms without departing from the spirit or scope of aspects of the subject matter described herein.

For example, the deletion of old user accounts or creation of new account may serve as an indicator that the possessor of the device 210 has changed. As another example, a user may explicitly indicate via a user interface that possession has changed. As yet another example, external data (e.g., change in domain, network connections, a database, other data, or the like), may indicate that possession has changed. The above examples are not intended to be all-inclusive or exhaustive of the different mechanisms by which the orchestrating agent 225 may detect that possession of the device 210 has changed.

In response to detecting a change in possession of the device 210, if the new possessor is a legitimate stakeholder of the device 210, the orchestrating agent may guide the new possessor through taking ownership of the security device 227 and entering PINs and passphrases for protector data. In conjunction with this, the orchestrating agent 225 may update the protector store 206 and the escrow service 235 with the updated protector data as appropriate.

In one implementation, the orchestrating agent 225, upon receiving a self-initiated request from the active session (which indicates anyone authorized to logon), whether privileged or unprivileged, requesting a pin or passphrase change for a protected volume, having a compatible protector in the protector store 206, may, after updating the protector store 206, then record in a system audit log, an indication of the intent to change the pin or passphrase, the sender's authenticated user's name (of the active session), an identifier or name of the volume, and not include the actual literal value of the PIN or passphrase.

At block 410, the orchestrating agent 225 may determine that an active session is present on the device 210. In one implementation, an active session may be defined as detecting that a user has physically logged onto the device 210 via an input device (e.g., using a keyboard, mouse, or other input device directly connected to the device 210) of the computing device and that a time of last input from the user occurred within a configurable period of time from the logon. In another implementation an active session may be defined as including both the above physical presence logon and also including logging on remotely to the secured device and interacting with a user interface of the device 210 as if actually at the device 210. This second type of active session is sometimes referred to as an interactive logon.

At block 415, the orchestrating agent 225 may cause (directly or indirectly) a reboot of the device. A reboot may be needed to perform certain operations (e.g., initializing a security device, taking ownership of a security device, other operations, and the like).

At block 420, user input may be obtained at the operating system (OS) level. In one embodiment, the operating system (OS) level is any level after the BIOS startup routines have completed and the device is executing code other than the BIOS startup routines. The user input may be obtained from an active session.

At block 425, user input may be obtained at the BIOS level. As is known to those skilled in the art, many computers come with a BIOS. A BIOS may provide basic routines during startup of the computer. For computers with a security device 227, the BIOS may be used to initialize and take ownership of the security device 227. These operations of the BIOS may occur outside of the operations of an operating system loaded by the BIOS. In other words, these operations may occur when the device 210 is powered on or reset and prior to the device 210 executing operating system code. User input at this level may be restricted to a physical presence (e.g., input from the keyboard, mouse, or other input components of the computer) or may allow both physical presence and some form of remote access (e.g., baseboard communication through a proprietary or industry standard protocol).

At block 430, an encryption operation may be performed. For example, an encryption operation may encrypt the data of a volume. As another example, an encryption operation may involve generating, storing, retrieving, updating, deleting, encrypting, or performing another operation on a key. As mentioned previously, an encryption operation may take a variable amount of time.

At block 435, a key may be escrowed. For example, referring to FIG. 2, the orchestrating agent 225 may send protector data that includes the key to the escrow service 235 for storing on the recovery store 205. As mentioned previously, this protector data allows protected data to be unlocked as needed for a legitimate stakeholder to gain access to the protected data.

At block 440, a change to the device may be detected. A change to the device may include, for example, adding or removing a fixed, removable, or remote volume, reconfiguring a security device of the computing device, making operating system or other component changes to the device, or the like.

The actions described above are not intended to be all-inclusive or exhaustive of other actions that may be detected by or trigger certain behavior in an orchestrating agent. Based on the teachings herein, those skilled in the art may recognize other actions that may also be detected by or trigger certain behavior in an orchestrating agent without departing from the spirit or scope of aspects of the subject matter described herein.

FIG. 5 is a flow diagram that generally represents exemplary actions that may occur at an escrow service in accordance with aspects of the subject matter described herein. The actions begin at block 505.

At block 510, protector data is received. For example, referring to FIG. 2, the escrow service 235 may receive protector data for a volume of the device 210 from the orchestrating agent 225.

At block 515, the protector data may be stored in a recovery store. For example, referring to FIG. 2, the escrow service 235 may store the protector data received at block 510 in the recovery store 205.

At block 520, a confirmation may be sent. For example, referring to FIG. 2, the escrow service 235 may send a message to the orchestrating agent 225 confirming that the protector data has been stored.

At block 525, other actions, if any, may be performed.

As can be seen from the foregoing detailed description, aspects have been described related to encryption lifecycle management. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
   installing an orchestrating agent on a computing device;
   facilitating, by the orchestrating agent, that a set of actions be performed in an order, the set of actions, when performed in the order, cryptographically protecting volume data of at least one volume of one or more storage devices connected to the computing device, the facilitating including:
      determining, by the orchestrating agent, that an active session is present on the computing device in conjunction with at least one of the actions; and
      sending, by the orchestrating agent, protector data obtained by at least one of the actions to an escrow service for storing the protector data on a recovery store external to the computing device, the protector data usable to unlock at least one of the volumes of the computing device, wherein the set of actions comprises:
         obtaining the protector data of a type for an operating system volume of the computing device, the type specified by configuration data used by the orchestrating agent;
         storing the protector data in a protector store of the computing device;
         receiving confirmation that the protector data was stored on the recovery store; and
         after the receiving confirmation that the protector data was stored on the recovery store, allowing the operating system volume to be encrypted.

2. The method of claim 1, wherein installing an orchestrating agent on a computing device comprises installing code on the computing device automatically via an authorized external program sending the code to the computing device, the program instructing the computing device to store the code on a storage device of the computing device.

3. The method of claim 1, wherein the set of actions comprises:
   requesting, by the orchestrating agent, that a root trust device of the computing device be initialized;
   taking ownership of the root trust device;
   obtaining, by the orchestrating agent, ownership data from the root trust device, the ownership data usable to obtain ownership of the root trust device; and
   sending, by the orchestrating agent, the ownership data to the escrow service for storing the ownership data on the recovery store.

4. The method of claim 1, obtaining the protector data for an operating system volume of the computing device comprises obtaining a key from a root trust device of the computing device.

5. The method of claim 4, wherein obtaining the protector data for an operating system volume of the computing device further comprises:
   the determining, by the orchestrating agent, that an active session is present on the computing device;
   obtaining a PIN via an input interface of the computing device; and
   combining the key from the root trust device with the PIN in conjunction with generating the protector data, the combining occurring prior to the sending, by the orchestrating agent, protector data obtained by at least one of the actions to an escrow service and prior to the allowing the operating system volume to be encrypted.

6. The method of claim 1, wherein the determining, by the orchestrating agent, that an active session is present on the computing device comprises detecting that a user has logged onto the computing device via an input device of the computing device, that the user is currently logged on to the computing device, and that a time between a last input from the input device and an input from the input device just previous to the last input has not exceeded a configurable period of time.

7. The method of claim 1, wherein the set of actions comprises after encrypting an operating system volume of the computing device, performing actions, including:
   the determining, by the orchestrating agent, that an active session is present on the computing device;
   obtaining the protector data for a non-operating system volume of a storage device of the computing device;
   storing the protector data on a protector store of the computing device;
   sending the protector data to the escrow service for storing the protector data on the recovery store;

receiving confirmation that the protector data was stored on the recovery store; and after the receiving confirmation that the protector data was stored on the recovery store, allowing the non-operating system volume to be encrypted.

8. The method of claim 7, wherein obtaining the protector data for a non-operating system volume of a storage device of the computing device comprises:

determining via configuration data that the non-operating system volume is to be protected by a passphrase;

obtaining the passphrase via an input interface of the computing device; and incorporating the passphrase or data derived therefrom into the protector data.

9. The method of claim 1, wherein the set of actions comprises:

detecting that an additional storage device has been connected to the computing device;

detecting that the additional storage device includes an additional volume;

detecting that the additional volume is not protected;

the determining, by the orchestrating agent, that an active session is present on the computing device;

obtaining a passphrase for the additional volume via an input interface of the computing device;

incorporating the passphrase or data derived therefrom into the protector data;

storing the protector data on a protector store of the computing device; and attempting to send the protector data to the escrow service for storing on the recovery store.

10. The method of claim 1, wherein facilitating, by the orchestrating agent, that a set of actions be performed in an order comprises that the actions be performed, potentially with other actions interspersed with the set of actions, the order including:

first, initializing a root trust device;

second, taking ownership of the root trust device;

third, obtaining security data from the root trust device;

fourth, sending the security data to the escrow service for storing on a recovery store;

fifth, obtaining first protector data for an operating system volume of the computing device;

sixth, sending the first protector data to the escrow service for storing on a recovery store;

seventh, performing an encryption operation on the operating system volume;

eighth, obtaining second protector data for a fixed volume of the computing device;

ninth, sending the second protector data to the escrow service for storing on the recovery store;

tenth, performing an encryption operation on the fixed volume;

eleventh, obtaining auto-unlock protector data for the fixed volume, the auto-unlock protector data independently allowing the fixed volume to be unlocked as long as the fixed volume is housed within a chassis of the computing device and the operating system volume is unlocked; and twelfth, storing the auto-unlock protector data on the operating system volume.

11. In a computing environment, a system, comprising:

a root trust device that includes a cryptographic key generator and nonvolatile memory capable of storing data;

one or more storage devices connected to a computing device, the one or more storage devices having one or more volumes thereon;

a protector store operable to maintain protector data that is usable to unlock the one or more volumes; and an orchestrating agent operable to facilitate cryptographically protecting the computing device and the one or more volumes by performing actions in a pre-defined order, the orchestrating agent further operable to determine that an active session with a user is occurring on the device in conjunction with at least one of the actions, the orchestrating agent further operable to send the protector data to an escrow service for storing the protector data on a recovery store external to the device, wherein the orchestrating agent is operable to perform a first set of actions, the first set of actions comprising:

requesting that the root trust device be initialized;

taking ownership of the root trust device;

obtaining security data from the root trust device, the security data usable to obtain ownership of the root trust device; and sending the security data to the escrow service for storing the security data on the recovery store, wherein one of the volumes is an operating system volume that stores an operating system of the computing device, and wherein the orchestrating agent is operable to perform a second set of actions after the first set of actions, the second set of actions comprising:

obtaining the protector data of the operating system volume;

storing the protector data in the protector store;

receiving confirmation that the protector data was stored on the recovery store; and after the receiving confirmation that the protector data was stored on the recovery store, allowing the operating system volume to be encrypted.

12. The system of claim 11, wherein the root trust device comprises a security device having at least the following characteristics: the security device is operable to generate and store cryptographic keys, the security device has a secret key embedded therein, the security device is operable to authenticate hardware devices of the computing device.

13. The system of claim 11, further comprising an input interface operable to receive input from an entity external to the computing device, and wherein the orchestrating agent is operable to obtain the protector data of the operating system volume by performing actions, comprising:

determining that an active session is present on the computing device;

obtaining a PIN via the input interface of the computing device; and combining a key from the root trust device with the PIN to obtain the protector data of the operating system volume.

14. The system of claim 11, wherein the orchestrating agent is operable to perform a third set of actions after the second set of actions and after protecting any fixed volumes of the computing device, the third set of actions comprising:

determining that an active session is present on the device;

obtaining the protector data for a removable volume of a storage device of the computing device;

storing the protector data on the protector store;

attempting, up to a configurable number of times, to send the protector data to the recovery store; and allowing the removable volume to be encrypted even if the attempting to send the protector data to the recovery store fails.

15. The system of claim 14, wherein the orchestrating agent is operable to obtain the protector data for a non-operating system volume of a storage device of the computing device by performing actions, comprising:
  obtaining a passphrase via the input interface; and
  incorporating the passphrase or data derived therefrom into the protector data.

16. A computer storage memory having computer-executable instructions, which when executed perform actions, comprising:
  from an orchestrating agent located on a computing device having one or more storage devices that include one or more volumes, the orchestrating agent operable to facilitate cryptographically protecting the computing device and the one or more volumes by performing actions in a pre-defined order, the orchestrating agent further operable to determine that an active session with a user is occurring on the device in conjunction with at least one of the actions, receiving, by an escrow service, protector data used to cryptographically protect volume data of the computing device;
  storing, by the escrow service, the protector data in a recovery store external to the computing device;
  and sending confirmation to the orchestrating agent that the protector data has been stored.

17. The computer storage memory of claim 16, further comprising from the orchestrating agent, receiving ownership data usable to obtain ownership of a root trust device, a key from the root trust device used together with a PIN to protect an operating system volume of the computing device.

* * * * *